United States Patent [19]

Liou

[11] Patent Number: 5,052,201

[45] Date of Patent: Oct. 1, 1991

[54] AUTOMOBILE STEERING WHEEL LOCK

[76] Inventor: Jaieter Liou, No. 48, Tung Hua Street, San Min District, Kaohsiung, Taiwan

[21] Appl. No.: 553,637

[22] Filed: Jul. 18, 1990

[51] Int. Cl.$^5$ .............................................. B60R 25/02
[52] U.S. Cl. ............................................ 70/209; 70/226
[58] Field of Search .................................. 70/209-212, 70/225-227, 237

[56] References Cited

U.S. PATENT DOCUMENTS

| | | | |
|---|---|---|---|
| 1,421,020 | 6/1922 | Miller | 70/211 |
| 3,462,982 | 8/1969 | Moore | 70/209 |
| 4,103,524 | 8/1978 | Mitchell et al. | 70/237 |
| 4,829,797 | 5/1989 | Wu | 70/226 |
| 4,882,920 | 11/1989 | Wu | 70/209 |
| 4,887,443 | 12/1989 | Wang | 70/209 |
| 4,935,047 | 6/1990 | Wu | 70/209 |

FOREIGN PATENT DOCUMENTS 106072 12/1966 Denmark ............................ 70/209

Primary Examiner—Gary L. Smith
Assistant Examiner—Darnell Boucher
Attorney, Agent, or Firm—Fleit, Jacobson, Cohn, Price, Holman & Stern

[57] ABSTRACT

An automobile steering wheel lock comprising a recheted stick with a hooked end and a lock block with a stick hole to receive the stick therein and have itself slidable along the stick. The lock block comprises a pawl which is biased by a spring to engage the ratchet of the stick so that when the hook of stick is hooked on a spoke of a steering wheel, the lock block is movable toward the hooked end of stick to secure it on the steering wheel and not able to withdraw, owing to the engagement of the pawl with the ratchet. A de-engaging device is provided to release the engagement of the pawl with the ratchet so as to remove the lock off the steering wheel.

3 Claims, 2 Drawing Sheets

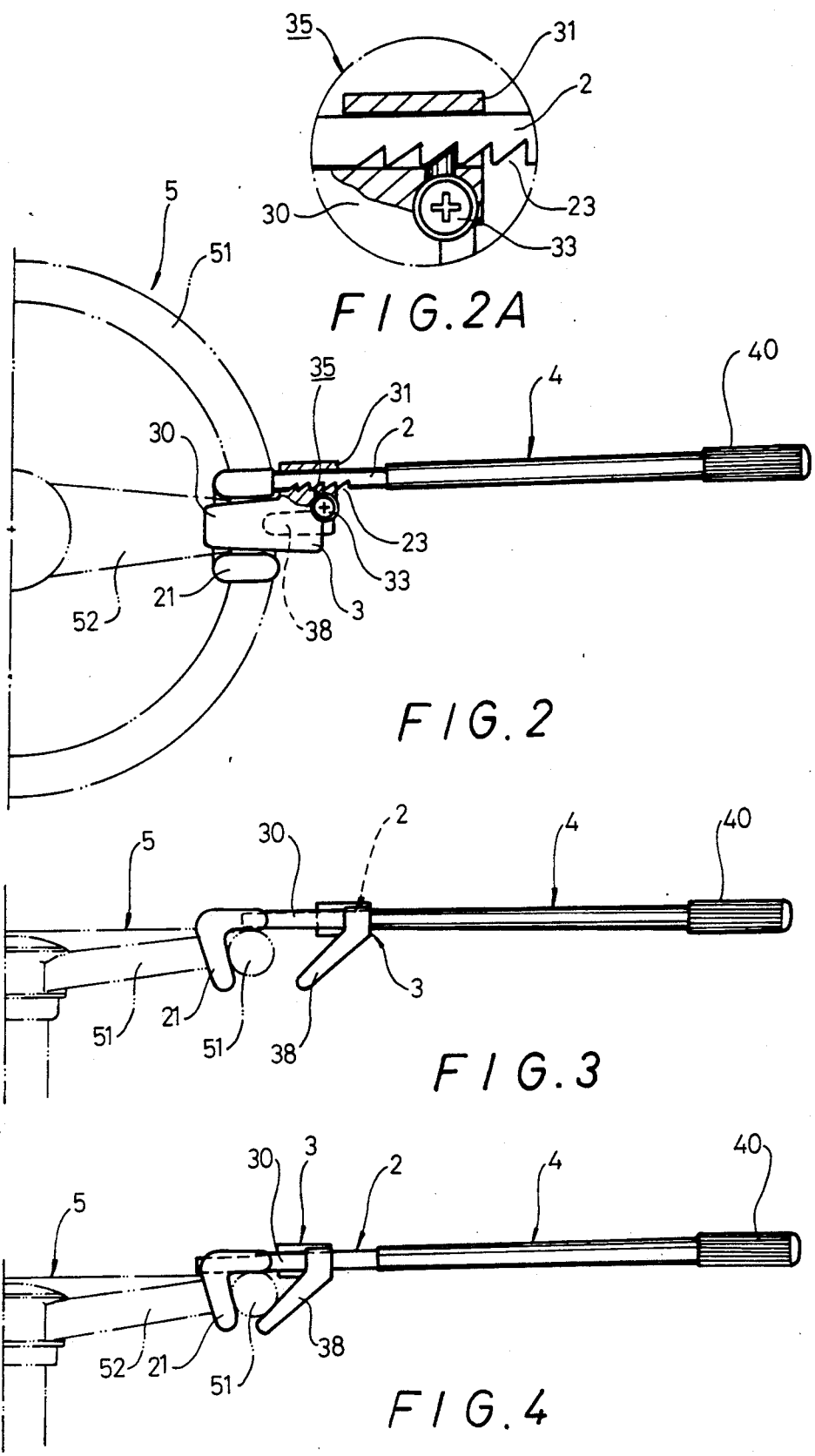

AUTOMOBILE STEERING WHEEL LOCK

FIELD OF THE INVENTION

The present invention relates, in general, to a locking device, and in particular to an automobile steering wheel lock which can be secured on a steering wheel to prevent it from being rotated freely.

BACKGROUND OF THE INVENTION

Automobile steering wheel locks are very helpful in preventing un-authorized operation of automobiles, even though automobiles having been broken in. Conventionally, an automobile steering wheel lock comprises an elongated stick with a lock block attached thereon. The stick is made of two portions which are slidable with respect to each other and the lock block, when locked, is used to prevent the two portions from sliding away from each other. With a hook formed on the remote end of each stick portion, the stick can be secured between the steering wheel and the brake pedal or the accelerator pedal of an automobile by hooking on one of the spokes of the steering wheel with the hook on one end and the pedal with the other hook so that the free rotation of the steering wheel is prevented.

One of the methods to control the extension of the stick is by means of threaded elements. The disadvantage is that after some times, the engagement of the threaded elements will get loose and, thus, making the control of the extension of the stick difficult.

Furthermore, to secure a conventional steering wheel lock between one of the pedals and the steering wheel is rather inconvenient, especially in such a tight room inside a small passenger car.

It is, therefore, an object of the present invention to provide an automobile steering wheel lock having no such disadvantages as mentioned above.

SUMMARY OF THE INVENTION

An object of the present invention is to provide an automobile steering wheel lock which does not comprise threaded elements so that the drawbacks owing to the threaded elements are eliminated.

It is another object of the present invention to provide an automobile steering wheel lock that locks onto a single portion a steering wheel and that effectively prevents the steering wheel of an automobile from being rotated freely without hooking on the other portions of the automobile.

To achieve the above and other objects, there is provided an automobile steering wheel lock which comprises a stick having a hook formed on one end thereof which is so bent as to be able to hook singly onto a spoke of a steering wheel, a lock block having a stick hole to receive the other end of the stick therein and to have it penetrate therethrough so as to be slidable with respect thereto, and an elongated tube having the inside diameter slightly larger than the diameter of the stick and the outside diameter larger than the diameter of the stick hole. The elongated tube is to be securely fixed on the un-hooked end of the stick to block the lock block from sliding off the stick.

The lock block comprises a pawl which is spring-biased toward a ratcheted portion formed on the stick and to engage therewith to prevent the lock block from being moved away therefrom freely. The withdrawal of the pawl is controlled by a lock plug, such as a lock plug of a cylinder lock. The lock block further comprises a steep or inclined protrusion which is disposed so that when the stick hooks on a steering wheel and the lock block is moved to abut, against the wheel rim of the steering wheel, the space between the protrusion and the lock block will receive the wheel rim therein and, thus, preventing the stick from being removed out of the steering wheel laterally.

With a long stick secured on the wheel rim of an automobile steering wheel, it is very difficult to freely rotate the steering wheel and, thus, protect the automobile from being operated without authorization.

The above and other aspects of the invention, as well as other benefits, will readily be ascertained from the following detailed description of the preferred embodiment, accompanying with the attached drawings, in which.

BRIEF DESCRIPTION OF THE DRAWINGS

FIG. 2 shows a top view of the automobile steering wheel lock, together with part of a steering wheel on which the steering wheel lock is secured and locked;

FIG. 2a shows and enlarged portion of FIG. 2; wherein part of the lock block is broken to show inside construction of the lock block;

FIG. 3 shows a side view of the automobile steering wheel lock in an un-locked position; and FIG. 4 shows a side view of the automobile steering wheel lock in a locked position.

DETAILED DESCRIPTION OF THE INVENTION

Figure 1:
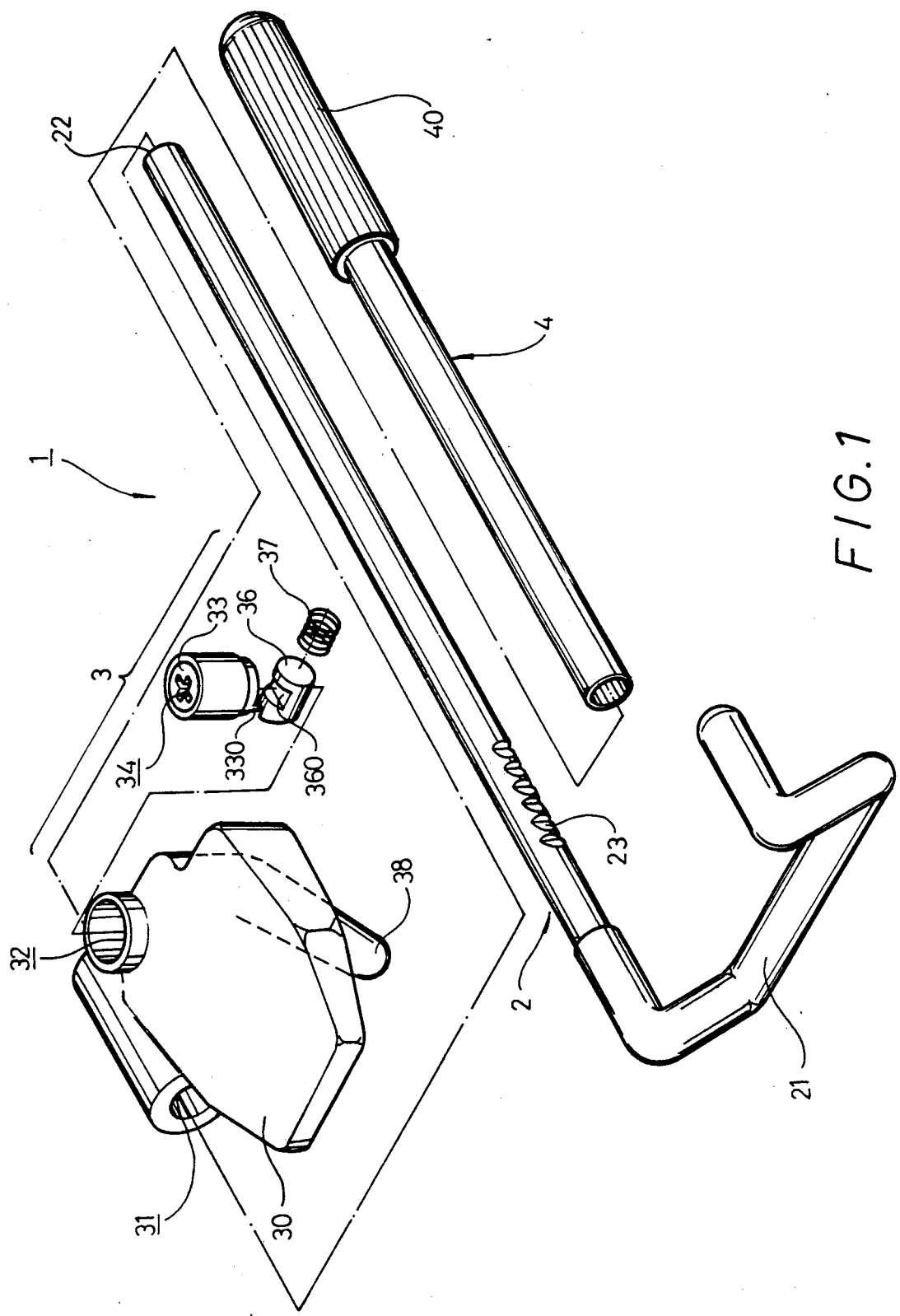
FIG. 1 shows a fragmentary view of an automobile steering wheel lock in accordance with the present invention.

With reference to the drawings and in particular to FIGS. 1 and 2, an automobile steering wheel lock in accordance with the invention, generally designated by 1, comprises a ratcheted stick 2 having a hooked end 21 and an un-hooked end 22, a lock block 3 having a body 30 with a stick hole 31 running therethrough to receive the un-hooked end 22 of the ratcheted stick 2 therein, and an elongated tube 4 with one end open and a handle 40 formed around the other end. The hooked end 21 of the stick 2 is bent to a suitable angle so as to be able to hook on a spoke 52 of a steering wheel 5. The inside diameter of the tube 4 is slightly greater than the diameter of the stick 2 so that the un-hooked end 22 of the stick 2 is insertable into the tube 4. To assemble the automobile steering wheel lock 1, the stick 2 is first inserted into and penetrated through the stick hole 31 of the lock block 3 and then into the tube 4. The dimensions of the stick hole 31 of the lock block 3 and the tube 4 are so designed that the lock block 3 is slidable along the stick 2 within an extension limited and defined by the open end of the tube 4 and the hook 21 of the stick 2. The tube 4, after receiving the un-hooked end 22 of the stick 2 therein, is securely fixed on the stick 2 by suitable means, such as rivets so as to prevent the lock block 3 from sliding off the stick 2.

The lock block 3 further comprises a plug hole 32 which does not run completely through the body 30 of the lock block 3 and inside which a lock plug 33 with a key way 34 formed therein is disposed. The axes of the stick hole 31 and the plug hole 32 in general have different orientations and do not intersect with each other. Preferably, these axes are mutually perpendicular, while not intersecting with each other. Connecting between the stick hole 31 and the plug hole 32 is a pawl hole 35 inside which a pawl 36 is disposed. The pawl 36 is biased by a spring 37 to engage with the ratchet 23 of the stick 2. The ratchet 23 and the pawl are designed so that when the pawl 36 engages with the ratchet 23, the lock block is only slidable toward the hooked end 21 and is prohibited by hook 21 from sliding.

The pawl 36 and the plug 33 are so disposed with respect to each other that the rotation of the plug 33 moves the pawl 36 against the spring 37 by means of cam-follower movement. The plug 33 comprises locking means(not shown), which is unrelated to the present invention and will be given no description herein, to prevent it from being rotated without a key (not shown). At the inner end of the plug 33, a first caming surface 330, in the form of a projection, is formed and abuts against a second caming surface 360 formed on the pawl 36 so that when the plug 33 is rotated, the projection 330 pushes the second caming surface 360 and thus moving the pawl 36 against the spring 37. With the pawl 36 being withdrawn by the rotation of the plug 33, the lock block is slidable toward the un-hooked end 22 of the stick 2.

The lock block 3 further comprises an elongated protrusion 38 which is so inclined that the space formed between it and the body 30 of the lock block 3 can receive a wheel rim 51 of the steering wheel 5 therein, as shown in FIG. 4. Referring now to FIGS. 3 and 4 wherein the procedure of securing the automobile steering wheel lock 1 is shown, to secure the automobile steering wheel 1 on the steering wheel 5, the hooked end 21 of the stick is first hooked singly onto one of the spokes 52 of the steering wheel 5, as shown in FIG. 3. Then the lock block 3 is moved toward the steering wheel 5 until the hook 21 of the stick 2 and the elongated protrusion 38 of the lock block 3 tightly engage with the wheel rim 51 and fixedly secured thereon. When the lock 1 is secured on the steering wheel 5, as shown in FIG. 4, the distance between the tips of the protrusion 38 and the hook 21 is smaller than the diameter of the wheel ring 51 so as to prevent the lock 1 from being removed off the steering wheel. With such a long stick 2 fixed on the steering wheel 5, it is very difficult to rotate the steering wheel 5.

To remove the steering wheel lock 1 off the steering wheel 5, a key (not shown) is inserted into the key way 34 of the plug 33 to rotate it and, thus, withdrawing the pawl 36. The pawl 36 being withdrawn, the lock block 3 is slid away from the steering wheel 5 and the distance between the protrusion 38 of the lock block 3 and the hook 21 becomes larger than the diameter of the wheel rim 51. The automobile steering wheel lock 1 is thus removed off the steering wheel 5.

It should now be apparent that although the invention has been described with the preferred embodiment, it is contemplated that those skilled in the art may make changes to certain features of the preferred embodiment without altering the overall basic function and concept of the invention and without departing from the spirit and scope of the invention as defined in the appended claims.

What is claimed is:

1. An automobile steering wheel lock comprising:
   a stick having a hooked end and an un-hooked end and a racheted porton formed therebetween, said hooked end being so bent as to be able to hook solely onto one of a plurality of spokes of a steering wheel held together by a wheel rim of said steering wheel;
   a lock block comprising a body which has a first hole running therethrough to have said un-hooked end of said said stick penetrate therethrough and slidable with respect thereto, a second hole with one end thereof closed to receive and hold therein a lock plug of which one end has a first caming surface formed thereon and the other end has a key way formed thereon to received a key and have the plug rotated by said key, a third hole connecting therebetween and holding therein a pawl being so biased by a spring to engage with said racheted portion of said stick so that said lock block is only allowed to freely slide toward said wheel rim and said hooked end of said stick in a direction towards the center of the steering wheel during the locking operation, and an elongated protrusion extending from said lock block at an angle with respect thereto so that when said lock block slides toward said hooked end of said stick, a single portion of said steering wheel rim is trapped in the space between said body and said protrusion and is tightly held by said hooked end that hooks on said one spoke and said body, together with said protrusion, said pawl having a second caming surface formed thereon to be engageable with said first caming surface formed on said lock plug so that when said lock plug is rotated by said key, said first caming surface pushes said second caming surface thus moving said pawl against said spring to have said pawl disengage said racheted portion of said stick and said lock block thus being freely slidable away from said hooked end of said stick; and
   an elongated tube having a first end open to receive said unhooked end of said stick therein and securedly fixed thereon to prevent said lock block from being slid off said stick.

2. An automobile steering wheel lock as claimed in claim 1, wherein said elongated tube further comprising a handle portion formed around a second end thereof.

3. An automobile steering wheel lock as claimed in claim 1, wherein said lock plug is a plug of a cylinder lock.

* * * * *

UNITED STATES PATENT AND TRADEMARK OFFICE
CERTIFICATE OF CORRECTION

PATENT NO. : 5,052,201

DATED : October 1, 1991

INVENTOR(S) : Gaieter LIOU

It is certified that error appears in the above-identified patent and that said Letters Patent is hereby corrected as shown below:

Title page, item [76], "Jaieter Liou" should read

--Gaieter Liou--.

Signed and Sealed this

Twenty-second Day of June, 1993

Attest:

MICHAEL K. KIRK

Attesting Officer

Acting Commissioner of Patents and Trademarks